United States Patent [19]

Mehnert

[11] 4,219,526
[45] Aug. 26, 1980

[54] METHOD OF BLOW-MOLDING HOLLOW SHAPED ARTICLES, INCLUDING INTERMEDIATE TEMPERING AND FINAL BIAXIAL STRETCHING STAGES

[76] Inventor: Gottfried Mehnert, Messelstrasse 25, 1000 Berlin 33, Fed. Rep. of Germany

[21] Appl. No.: 921,258

[22] Filed: Jul. 3, 1978

Related U.S. Application Data

[63] Continuation of Ser. No. 740,851, Nov. 11, 1976, abandoned.

[30] Foreign Application Priority Data

Nov. 12, 1975 [DE] Fed. Rep. of Germany ....... 2550727

[51] Int. Cl.² ............................................. B29C 17/07
[52] U.S. Cl. .................................. 264/520; 264/521; 264/530; 425/526
[58] Field of Search ............ 264/89, 94, 96–99, 264/296, 520, 521, 523, 529, 530, 535, 537–543; 425/526, 530

[56] References Cited

U.S. PATENT DOCUMENTS

| | | | |
|---|---|---|---|
| 3,754,851 | 8/1973 | Reilly et al. | 264/98 X |
| 3,966,378 | 6/1976 | Valyi | 264/94 X |
| 3,970,419 | 7/1976 | Valyi | 264/94 X |

Primary Examiner—Jan H. Silbaugh
Attorney, Agent, or Firm—Michael J. Striker

[57] ABSTRACT

Plasticized parisons of synthetic thermoplastic material are formed in an extrusion machine from where they are transferred to a station to be pneumatically converted in the cavity of an open-and-shut premold into hollow blanks which are larger than the parison but smaller than the desired shaped article. During such pneumatic conversion the material of the parison may be subjected to shock-like cooling concomitantly with conversion into the blanks, by appropriate cooling of the premold. The hollow blanks are then transferred to an intermediate station where they are subjected to thermal tempering in two or more separate stages, in order to bring them to an optimum temperature condition for the subsequent biaxial stretching. After tempering, the tempered blanks are transferred to another station to be pneumatically converted into respective shaped articles in the cavity of another open-and-shut mold and under biaxial stretching of their material.

16 Claims, 5 Drawing Figures

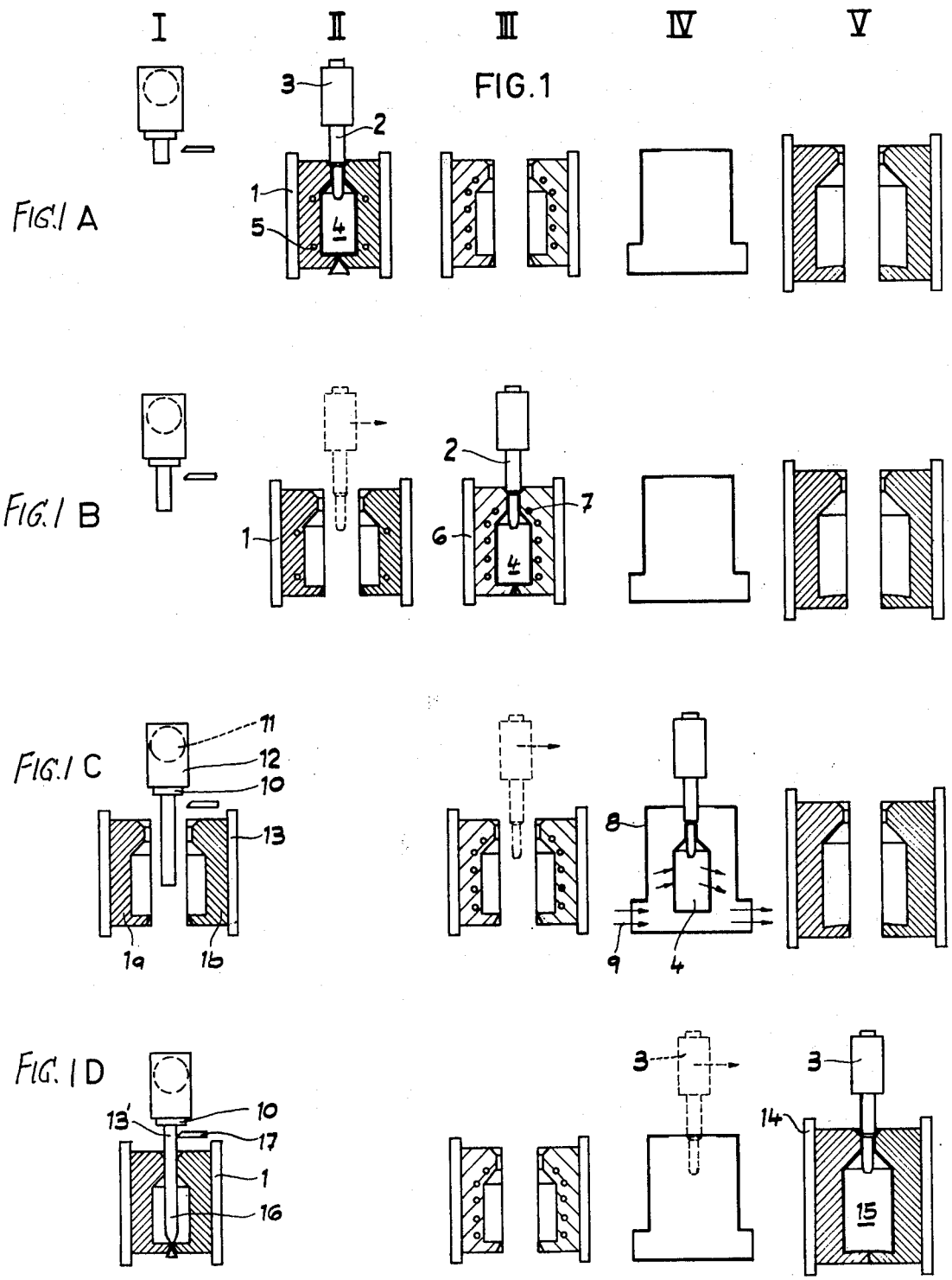

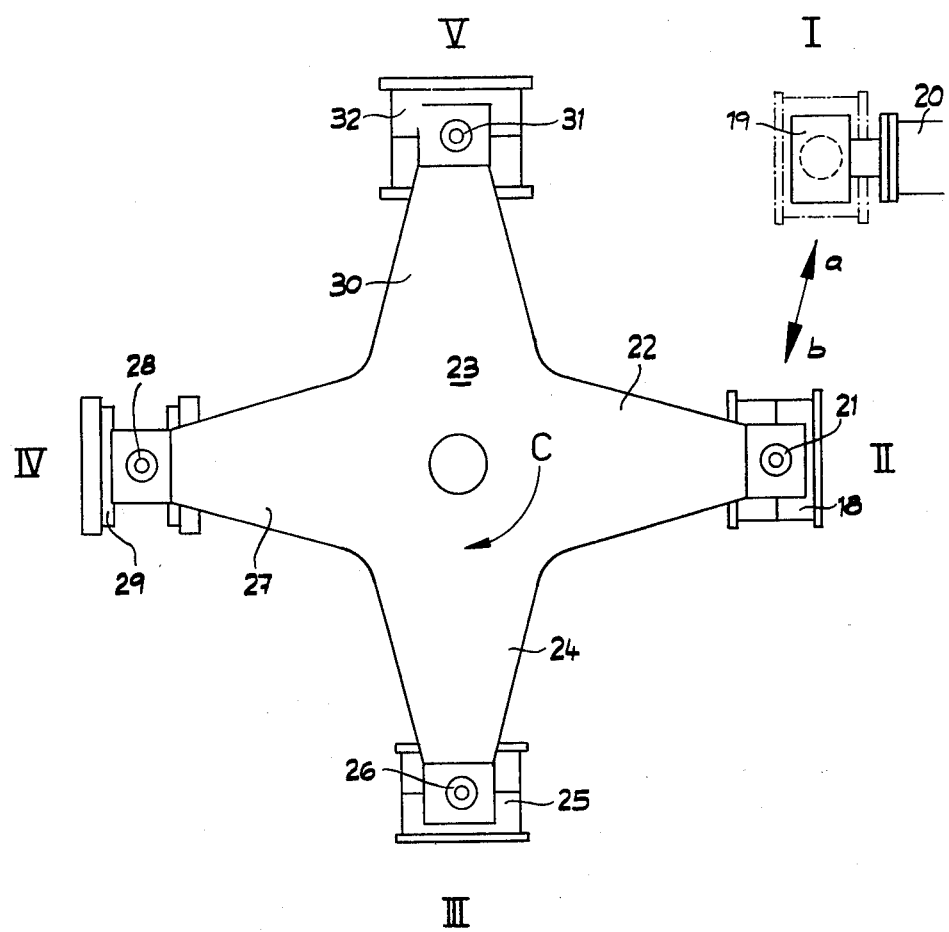

METHOD OF BLOW-MOLDING HOLLOW SHAPED ARTICLES, INCLUDING INTERMEDIATE TEMPERING AND FINAL BIAXIAL STRETCHING STAGES

CROSS-REFERENCE TO RELATED APPLICATION

This is a continuation of application Ser. No. 740,851 filed Nov. 11, 1976, now abandoned.

The present invention constitutes an improvement over my copending application Ser. No. 740,847, filed Nov. 11, 1976, and entitled "Multi-Stage Blow Molding of Hollow Shaped Articles", now abandoned.

BACKGROUND OF THE INVENTION

1. The Field of the Invention

This invention relates generally to the conversion of plasticized synthetic plastic parisons into hollow shaped articles by blow-molding.

More particularly, the invention relates to a method of effecting such a conversion by blow-molding in accordance with the so-called "biaxial stretching" technique.

In particular, the invention relates to a method of the just-described kind wherein parisons are first converted into hollow blanks, and the blanks are thermally tempered in two or more tempering stages before they are converted into the final shaped article.

2. The State of the Art

It is known from German allowed application No. 1,479,449 to make shaped hollow articles from synthetic thermoplastic material in a two-stage blow-molding operation. A plasticized tubular parison is extruded, usually continuously, from an extrusion machine and successive sections of the extruded parisons are confined in an open-and-shut mold. Either separately, or by the action of the closing mold, one end of the parison section confined in the mold is squeezed shut. The mold with the confined parison section is located at a blowing station where a blowing mandrel is inserted into the confined parison section and injects pressurized gas into the same, thereby pneumatically expanding the parison section into conformance with the size and shape of the mold cavity and producing the desired hollow shaped article.

The parison can be transferred from the extrusion machine to the blowing station in a variety of ways. For example, the mold may shuttle back and forth between the extrusion machine where it receives the parison sections and the blowing station where the pneumatic conversion takes place. However, it is also possible to use tongs or similar instrumentalities which engage a parison section that is severed from the parison being extruded, and transfer this section to the blowing station for confinement in the mold which, in such a case, does not move away from the blowing station. Similarly, there are ways of effecting the penumatic expansion of the parison section without resorting to the use of a blowing mandrel. For instance, a blowing needle may be laterally inserted through the wall of the parison section to expand the latter.

For reasons known to those skilled in the art, this type of blow-molding is not satisfactory in all circumstances. Therefore, in order to provided needed improvements the so-called "biaxial stretching" method of blow-molding was developed, which is disclosed, e.g. in German published application No. 2,161,066.

The initial operations in the biaxial stretching method are similar to those in the "simple" blow-molding method described above. A parison is extruded and parison sections confined in an open-and-shut mold. However, in the biaxial stretching method the shape of the mold cavity is not identical with the shape desired for the final article; it corresponds thereto only approximately. The same is true of the mold-cavity dimensions which are larger than those of the parison but smaller than the dimensions desired for the final article. Since this mold thus does not produce the final article—as in the "simple" blow-molding method—it is known as a "premold".

The parison section is expanded to the shape of the premold cavity, in the manner described earlier, thereby producing a hollow blank. The open-and-shut premold is then opened and the hollow blank is transferred into a final mold wherein the blank is again pneumatically expanded; since the cavity of the final mold has the shape and dimensions desired for the final article, this pneumatic expansion of the hollow blank accordingly produces the final article.

Transfer of the blank to the final mold can be effected in various ways. The final mold can shuttle from the final blowing station to the first blowing station, close about the hollow blank after the premold has exposed the same, and then travel with the enclosed blank to the final blowing station. Alternatively, the final mold may remain at the final blowing station, and the blank may be tranferred from the first blowing station to the final mold, for example by being suspended from a blowing mandrel which has already been used at the first blowing station to expand the parison section into the shape of the blank, and which blowing mandrel may be movable between the first and final blowing stations. However, the aforementioned blowing mandrel may instead remain at the first blowing station and the blank transfer may be effected by means of grippers or tongs. If the blowing mandrel used in conjunction with the premold is of the type which transfers the blank from the premold to the final mold, it may also be used to expand the blank in the final mold to the shape of the final article; alternately, a separate blowing mandrel may be provided for this purpose.

The reasons for the development of the biaxial-stretching type of blow-molding are known to those skilled in the art. They included, in particular, the assumption that the hollow blank would cool down during its transfer from the first blowing station to the final blowing station, so that the molecular stretching effect which results during axial and radial expansion of the blank in the final mold, would be "fixed", i.e. made irreversible, due to the lowered temperature of the blank material. This is desirble because, if attainable, it will significantly improve the strength of the finished hollow article and make it possible to either reduce the wall thickness of the article without loss of strength, or to obtain increased strength from the same wall thickness as was used previously.

Once placed in practical use, however, the biaxial-stretching method of blow-molding was found not to justify all the expectations which had been placed in it. Although the theory of molecular stretching or orienting, and the strength-improvements to be gained from "fixing" the molecules in their stretched condition, is correct, it was found that in practice it is extremely difficult to get the blanks to just the temperature which they are required to have prior to the final blowing if the required advantages are to accrue.

In particular, it was determined that as a rule the transporting time from the premold to the final mold is insufficient for the blanks to cool down to the desired lower temperature. To overcome this difficulty a method of blow-molding with biaxial stretching was developed which resorts to so-called "intermediate tempering" or conditioning of the blank.

This method operates in the same way as the above-described conventional biaxial stretching blow-molding method—until the point at which the blank leaves the premold. Rather than moving from the premold directly into the final mold, the blank now moves to a tempering station at which it undergoes thermal tempering, i.e. thermal conditioning. As disclosed in German published application No. 23 43 125, the tempering station may have a chamber into which the blank is introduced, whereupon air is blown through the chamber in order to adjust the temperature of the blank to a level at which it has the optimum temperature for the subsequent biaxial stretching in the final mold. In addition to the positive influence of this air, the dwell time of the blank in the chamber can also be selected in such a manner that a temperature equalization takes place over the active cross-section of the wall or walls of the blank, i.e. so that the temperature at the core of the wall is not or not substantially different from the temperature of the exposed outer surfaces of the wall.

Instead of using a chamber it is also possible to employ a mold which closes about the blank and cools the same by heat-exchange therewith. Such molds can be cooled by means of water or other cooling fluids.

Another possibility is to simply expose the blank at the tempering station and direct cooling air into contact with it, or even to let the blank dwell at the tempering station in exposed condition until the desired temperature is reached.

This "intermediate tempering" method represents a definite improvement over the prior state of the art. However, it is still not really satisfactory, basically for two reasons. Firstly, it decreases the working speed of machines which employ this method, because for the time period during which a blank is located at the tempering station, the just-produced next-following blank cannot be moved from the preform to the tempering station. Conversely of course, the final mold from which the preceding final article has been ejected, must remain idle and wait until the blank at the tempering station is ready to be passed on to the final mold. Secondly, it is not possible to adjust the blank to a precise temperature in the instances where tempering of the blank to an approximate temperature is not adequate or not acceptable.

SUMMARY OF THE INVENTION

Objects of the Invention

It is a general object of the invention to overcome the disadvantages which have been explained heretofore.

More particularly, it is an object of the present invention to provide an improved blow-molding method employing biaxial stretching.

Still more particularly, it is an object of the invention to provide such an improved blow-molding method employing biaxial stretching and which provides for improved intermediate tempering of the blanks prior to expansion of the blanks to the final article.

A concomitant object of the invention is to provide such an improved method which has a rapid rate of repetition of the operating steps and which therefore permits high-speed manufacture and in consequence is economical.

Still a further object of the invention is to provide such an improved method in which the blanks can be given, during tempering, the precise temperature which is the most advantageous one for the subsequent conversion and concomitant biaxial stretching into the final article.

An additional object of the invention is to provide such an improved method as outlined before wherein the tempering can be effected by cooling and/or heating of the blanks.

Still another object of the invention is to provide such a method wherein tempering can be effected by a combination of cooling and/or heating and appropriate dwell-time of the blanks at a tempering station, during which dwell time no positive tempering actions are performed on the blanks.

In keeping with these objects, and with others which will become apparent hereafter, a feature of the invention resides in a method of converting plasticized synthetic-plastic parisons into hollow-shaped articles by blow-molding, such method comprising the steps of forming a parison in an extrusion machine at a first station, pneumatically converting the parison at a second station into a hollow blank, transferring the hollow blank to an intermediate station, subjecting the hollow blank at the intermediate station to at least two successive tempering operations in successive tempering stages, and pneumatically converting the tempered blank into a shaped article.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1A–1D are respective diagrammatic illustrations, showing the different operating stages of the method according to the present invention; and FIG. 2 is a diagrammatic top-plan view of an apparatus for carrying out the novel method.

DESCRIPTION OF THE PREFERRED EMBODIMENTS

FIGS. 1A–1D

The operating principle of the present invention is illustrated in FIGS. 1A–1D which show successive operating stations. Common to FIGS. 1A–1D is the fact that in each Figure reference numeral I has been used to designate a station, for example an extrusion station, at which a preform or parison is produced, reference numeral II identifies a first or pre-blowing station, reference numerals III and IV designate two successive stages (there could be more) of a tempering station, and reference numeral V identifies the final blowing station. The first step of the operation is shown in FIG. 1A an successive steps are shown in FIGS. 1B, 1C and 1D, respectively.

With the foregoing explanatory comments in mind it is pointed out that in the operating stage shown in FIG. 1A a parison section is shown to be located at the station II after having been produced in form of an elongated tubular parison 13 (compare FIG. 1C) which is extruded from the extrusion nozzle 10 of the extruder head 12 of an extrusion machine 11. Details of the elements 10, 11 and 12 are not given because they are known per se to those skilled in the art and form no part of the invention.

The parison section located at the station II has been transferred from the station I and is located at the station II in the internal cavity of a preform or premold 1 which is of the open-and-shut type and has two relatively movable mold halves or mold sections 1A and 1B. FIG. 1A shows the parison at station II as having been expanded pneumatically by the admission of pressurized air or other gaseous fluid from the blowing aggregate 3 via the blowing mandrel 2, so that the hollow blank 4 is produced which conforms in shape and dimension to the interior of the cavity of the mold 1, and is thus larger than the dimension of the parison 1 but smaller and of slightly different shape than the desired final article. The premold 1 is cooled, for example by the diagrammatically illustrated cooling channels 5 which are provided in the sections 1A and 1B and through which a cooling fluid may be circulated. The details of the operation and control of mandrel 2 and aggregate 3, as well as of the manner in which cooling fluid is circulated through the channel 5, are known per se and require no illustration.

Upon completion of the blowing operation at the station II in FIG. 1A, the mold halves 1A and 1B move apart as shown at station II in FIG. 1B, and in this particular embodiment the aggregate 3 with the blowing mandrel 2 from which the blank 4 is suspended move in the direction of the arrow to the tempering station, and in particular to the stage III thereof. The blank 4 could of course be transported in another way also, as has been previously explained. At the stage III the blank 4 is cooled further. In the illustrated embodiment this is effected by having it confined between the mold sections VIA and VIB of a mold 6 which, as shown at III in FIG. 1A was open in readiness for the insertion of the blank 4 and as shown at III in FIG. 1B has now closed about the blank 4. It should be emphasized that the shape of the cavity of mold 6 is such that no changes whatever in shape or dimensions of blank 4 occur in the mold 6, since the mold 6 exclusively has the purpose of cooling the blank 4. For this purpose it is provided with a plurality of further cooling channels 7, and the larger number of such cooling channels 7 as compared to the smaller number of cooling channels 5 shown in the mold 1, is intended to signify that a further cooling of the blank 4 is obtained in the mold 6. It should be understood that in the first stage III the tempering of the blank 4 need not be in form of cooling, it could also be in form of heating or a combination of heating and/or cooling, for example heating certain parts of the blank 4 while cooling other parts thereof. In the illustrated embodiment, however, only cooling is carried out. Since no shape-changing of the blank 4 takes place in the mold 6, and thus no internal pneumatic pressure or the like is applied to the mold 6, the mold 6 can be of a less expensive and less deformation-resistant material than the mold 1, for example of aluminum; this has been symbolically illustrated by the hatching of the cross-section of the material of the mold 6, which hatching is different from the hatching employed for the mold 1.

After the desired tempering in stage III the blank 4 is transferred in the next operating step, shown in FIG. 1C, to the tempering stage IV. In the illustrated embodiment the stage at IV employs a conditioning chamber 8 which may have an open top or into which the blank 4 may be inserted in any other desired manner, for example laterally through appropriate openings of the like. In any case, the blank 4 which still depends from the mandrel 2 that has now travelled from stage III to stage IV, is accommodated in the conditioning chamber 8 and air is now blown into and through the chamber 8, as indicated by the arrows 9. Such air may again be cooling air, but it may also—and this is assumed with respect to FIG. 1C—be warmed air which now raises the temperature of the blank 4 to the temperature level which is most advantageous for the subsequent final blowing operation and biaxial stretching, the term most advantageous referring to the desired molecular stretching or orientation that occurs during biaxial stretching and the fixation of the molecules in the stretched condition. The air travelling through the chamber 8 and conditioning the blank 4 also serves to produce a complete or at least substantial temperature equilization over the cross-section of the walls of the blank 4, i.e. the temperature at the core of the wall thickness will be equal or substantially equal to the temperature at the inner and outer surfaces of the wall.

As the conditioning of the blank 4 takes place in the chamber 8 at the stage IV, the premold I travels from station II to station I with its sections or halves 1A and 1B in open position, and becomes located beneath the head 12 through the nozzle 10 of which a tubular parison 13 is being extruded in downward direction, the parison being of course of synthetic thermoplastic material in plasticized condition.

Referring now to FIG. 1D it will be seen that when tempering of the blank 4 is completed in the chamber 8 at the tempering stage IV, the now tempered blank 4 is transferred—in this instance again by moving the aggregate 3 with the blowing mandrel 2 and the blank 4 depending from the latter—through the final blowing station V where the blank enters into the space between the heretofore open halves 14A and 14B of the final blowing mold 14, which halves then close about it, whereupon pressurized gaseous fluid is again introduced via the mandrel 2 and the tempered blank 4 is further expanded and biaxially stretched to the shape and size of the cavity of the final mold 14, so that it thereby becomes converted into the finished shaped article 15. After becoming rigidified this article 15 is expelled from the final mold 14 upon opening of the mold sections 14A and 14B thereof.

During this latter operating stage a parison section 13 of sufficient length has been extruded from the nozzle 10 of head 12 at the station I (see FIG. 1D) and is severed from the newly extruded parison part 13' by a severing device 17—e.g. knife blade or the like—, while the mold halves 1A and 1B of the mold 1 close about it and at the same time pinch off and close the lower end of the thus confined parison section 13. Thereafter, the mold 1 with the enclosed parison section 13 returns to the station II in FIG. 1A, and the operating cycle starts over again.

The method as shown diagrammatically on hand of FIGS. 1A–1D is susceptible of a variety of modifications. It should be understood that although FIGS. 1A–1D illustrate—for purposes of clarity—only the production of a single final shaped article 15, such simplification has been chosen only to facilitate explanation. It is clear that the throughput per unit time can be increased, i.e. the number of final shaped articles 15 produced per unit time can be much higher than illustrated in FIGS. 1A–1D, for example by utilizing more than one of the blowing aggregates 3 and associated blowing mandrel 2. For example, when in the operating stage shown in FIG. 1C the mold 1 is at the station I, it can rapidly close, receive a new parison section and have already moved to the station II where the new parison section is being expanded as shown at II in FIG. 1A. Another possibility of increasing the output per unit time is to have the blowing aggregate 3 shuttle only e.g. between the station II and the first tempering stage III, rather than to have it shuttling between the station II, the stages III and IV and the station V as shown in the drawing. In such a modified embodiment the blank 4 would be transferred by the aggregate 3 and the blowing mandrel 2 only from the station II to the first tempering stage III and whereas the aggregate 3 would then promptly return to the station II the blank 4 tempered at the stage III would be transferred to the stage IV by another means, for example a gripper, tongs or the like which transfers the partially tempered blank 4 to the stage IV, i.e. in the illustrated embodiment chamber 8. Subsequently the blank 4 may be picked up from the stage IV and taken to the final blowing station V by a second aggregate 3 (not shown) which can shuttle between the station V and the stage IV. If grippers are employed, and such grippers are of course known per se in this art, they can also be used to transfer a parison section from the station I into the station II; in that case, the mold 1 would remain stationary at the station II and would only perform an open-and-shut movement, the parison section being inserted into the mold 1 by the gripper while the mold sections 1A and 1B are in open condition.

Another possibility encompassed by the invention is to expand a parison section at the station II into a hollow blank 4 and to cool it in the mold 1, while at the same time a previously produced blank 4 is being tempered by cooling at the stage III in the mold 6, a further blank 4 which was previously conditioned at stage III is subjected to final conditioning at stage IV in the chamber 8, and at the same time a tempered blank 4 is being converted by pneumatic expansion and by axial stretching in the mold 14 at the station V into a final shaped article 15. If such a procedure is followed then in the next-following operating stage the mold 14 would be opened and the article 15 would be expelled, while a conditioned blank 4 would be transferred into the mold 14 from the chamber 8, the latter receiving a cooled blank 4 from the mold 6 at the stage III, and a pre-blown blank 4 would be transferred into the mold 6 from the mold 1 at the station II, as the latter would receive a new parison section that had been produced at the station I.

What is of central importance in accordance with the present invention is the fact that the tempering of the blanks 4 which have been pre-blown in the station II is now caried out in at least two or more stages, such as for example the stages III and IV. It should be understood, however, that these stages need not be constructed as a cooling mold 6 as shown at stage III and a conditioning chamber 8 as shown at stage IV. It is within the concept and intent of the present invention to use, e.g. two successive conditioning chambers 8, or two successive cooling molds 6. It is also possible to eliminate the chamber 8 at the second tempering stage IV and instead to employ simply a dwell-time period, i.e. to have the blank 4 which was previously cooled at the stage III simply hang for a period of time at the stage IV suspended, e.g. from the blowing mandrel 2, without subjecting it to any external influences whatsoever except the action of the ambient air. Evidently, the blank 4 need not be suspended from a blowing mandrel, either, but could be suspended from grippers or the like or could even stand on a support.

It is possible that under certain conditions or for certain purposes it becomes necessary to already rather strongly cool the blank 4 produced in the mold 1. If that is required, then it is advantageous in accordance with the present invention if the blank 4 is cooled rapidly and strongly at the moment of its creation. In other words, at the moment at which the parison section is pneumatically expanded to form the blank 4, its material is rapidly cooled by coming in contact with the inner surface bounding the mold activity of the mold 1. For this purpose the mold 1 can be cooled very strongly so that the heat-exchange effect upon the material of the expanding parison section as it comes into contact with the surfaces of the mold 1, is so high and quick that a "shock-like" cooling is obtained. The term "shock-like" as employed herein is intended to mean that the cooling of the material of the parison section at the moment at which it becomes converted into the blank 4 and contacts the surfaces of the mold 1, is so strong and so rapid that the synthetic thermoplastic material is just able to withstand it without crystalization or other deleterious structural changes.

It is also within the purview of the invention to effect tempering of the blank 4 both at the interior and the exterior surfaces thereof. For example, the interior of the blank 4 may be flushed, e.g. by admitting cooled air into the blank 4 via the blowing mandrel or in other suitable manner. This "interior tempering" can be controlled and varied, both as to the temperature and quantity of air that is admitted and makes it possible to decrease the cooling time required as well as to counteract the danger of layering. This danger is the greater, the larger the temperature difference between the exterior and interior wall surfaces of the blanks 4 during the blowing operations which take place at the stations I and V. The layers which thus form may have different molecular structures and may therefore have different characteristics which, by the time the final shaped article 15 has been produced, will have disappeared only partially or not at all. By providing a more or less simultaneous tempering action on the interior or exterior surfaces of the blank 4, however, the temperatures across the thickness of the wall or walls of the blank 4 can be made uniform or substantially uniform, i.e. the curve representative of the temperature variation across the wall cross-section of the blank 4 can be decreased until it approaches the horizontal or is at least converted into an only slightly bowed curve, and in either case layering is avoided to all intents and purposes. Of course, tempering of the internal and external surfaces of the blank 4 need not be carried out simultaneously; the internal surfaces might be tempered first and in a successive stage the external surfaces could be tempered, or vice versa. An effect similar to the one obtained by the internal and external tempering of the blanks 4 can be achieved by turning the blanks 4—either alone or with the container in which they are accommodated, e.g. the mold 6 or the chamber 8—about their longitudinal axis, which coincides with the longitudinal axis of the blowing mandrel 2.

FIGURE 2

An exemplary apparaus for carrying out the novel method is illustrated diagrammatically in FIG. 2. It should be understood that all the details concerning the mold movements, the movements of the mandrels, the admission of fluid for purposes of blowing the blanks, are already known per se and therefore require no detailed description to be understood by those skilled in the art.

The apparatus of FIG. 2 has a pre-blowing mold 18 which may either be stationarily located at the pre-blowing station II where is performs only movements between an open and a shut position, or which may shuttle back and forth in the direction of the double-headed arrow a–b between the station II and an extrusion station I. If the mold 18 is permanently located at the station II, then parison sections produced at the station I by the extrusion head 19 of an extrusion machine 20 are transferred from the station I into the open mold 18 at the station II in suitable manner, for example by means of grippers. If the mold 18 is of the type which can shuttle between the stations II and I, then it will move in open position—that is with its two mold halves part—from the station II to the station I where it will close about a parison section being extruded from the head 19 (compare FIGS. 1C and 1D) and will then return with this parison section to the station II in the direction of the arrow b.

In either case, when the mold 18 is located at the station II and accommodates within itself a parison section to be expanded, a first blowing mandrel of a blowing aggregate 21 enters in known manner into the parison section that is located in the mold 18 and pneumatically expands the parison section to form a hollow blank corresponding to the blanks shown and described with reference to FIGS. 1A–1D.

The apparatus in FIG. 2 has a four-armed spider 23 which rotates in the direction of the arrow C about a central support 23a, the rotation being incremental through 90° each time. The arms of the spider 23 are identified with reference numerals 22, 24, 27 and 30, respectively. Blowing aggregate 21 is mounted on the outer end of the arm 22 with which it rotates; when the aggregate 21 is located at the station II above the mold 18, the outer end of the circumferentially successive arm 24 of the spider 23 is located at the station III above a cooling mold 25 which is shown in closed condition and corresponds generally to the mold 6 of FIGS. 1A–1D. The outer end of arm 24 carries a further blowing aggregate 26, a blowing mandrel of which (not shown) supports a blank (not shown) that was previously produced at the station II and has now entered between the sections of the mold 25 before the latter has closed about it and at this time effects cooling of the thus-supported blank. During the same time period the outer end of the arm 27, which carries a further blowing aggregate 28 from a blowing mandrel of which (not shown) there is suspended a blank that was previously tempered at the station III, is located at the station IV to be tempered further, for example in the illustrated embodiment to be heated by a diagrammatically illustrated infrared heater 29. Also at the same time the outer end of the arm 30 carrying a fourth blowing aggregate 31 from which a completely tempered blank (not shown) is suspended on the blowing mandrel (not shown) of the aggregate 31, is located at the final blowing station 5, the blank being located between the closed sections of the final blowing mold 32 and pressurized fluid being admitted from the aggregate 31 into the temperated blank so as to expand it under biaxial stretching into the final article (not shown).

In an apparatus constructed in the manner of FIG. 2, or analogously, the time required for each operating stage, that is the time which elapses between each stepwise advance (here 90°) of the arms of the spider 23 from station to station, can be held just short enough to correspond to the minimum dwell time which is required in any and all blow-molding processes, i.e. the time required for the transportation of a parison section from the station I to the station II, or for the shuttling of the mold 18 between the stations I and II, including the time required for a parison section to be received in the mold 18 at the station I. Thus, a time interval can be obtained between the movement of each of the arms of the spider from one station to the next-following station, which is composed of the time required for the rotation of the spider 23 itself to move each arm from one station to the next-following station, and the time required for the operations which are carried out at the respective stations. This combined time interval, that is the dwell time of each arm at each of the stations II–V, respectively, can be rather short, i.e. corresponding to the minimum time required for moving the parison sections from the station I to the station II, and yet this is adequate to obtain the desired degree of tempering before the blanks enter the final blowing mold at the station V. Heretofore, adequate tempering of the blanks in this length of time between successive operating stages was entirely impossible to obtain.

As already outlined with respect to FIGS. 1A–1D, it should be understood that the embodiment in FIG. 2 also is not limited to only two tempering stages, but that instead more than two such stages could be provided. It is also clear that internal tempering of the shaped blanks can be effected, for example by blowing cooled air into the interior of the blanks at the stations II and III, and by blowing heated air into the interior of the blanks at the station IV, or in another combination or sequence.

ADVANTAGES OF THE INVENTION

As has already been mentioned above, when blow-molding is carried out in the sequence of extruding a tubular parison, pre-blowing the parison to form a blank, tempering the blank, and finally blowing the tempered blank to form the finished shaped article, the length of time between successive operations, including the time of travel required from one to the next-following station, is directly dependent upon that operating stage which requires the longest period of time. In other words, this is the factor which governs the speed with which finished articles can be produced per unit time. Dependent upon the size of the finished articles to be produced, and therefore the quantity of synthetic plastic material in the several operating stations, this longest time period in the entire process is usually the tempering stage, particularly if it is considered that after the pre-blowing to form the hollow blanks it is difficult to produce the proper temperature required for the final blowing not only across the entire cross-sections of the walls of the blank but also at all different parts of the blank, that is at different parts of the blank which are spaced lengthwise thereof. By resorting to the present invention, however, according to which the tempering operation is carried out in two, three, four or possibly even more successive stages, the time required for the several operations is reduced and uniformized throughout the method, and the reduction in the time required per operating interval of course results in an increase of the output of finished articles per unit time.

By subdividing the tempering operation into a plurality of individual stages it is also possible to obtain a more precise regulation of the temperature of the blank being tempered, and to achieve a more nearly uniform temperature equilization throughout the cross-section of the blank wall, i.e. the core of the wall cross-section will have a temperature whch is at least substantially the same as the outer surfaces of the wall, i.e. the inner and outer surfaces of the wall. Also, if desired specific longitudinally spaced portions of the blank can be given different temperatures, for example a stream of cooling air could be directed against the neck portion of the blank and a stream of heating air could be directed against the body of the blank, to name an example which is not to be considered limiting in any way.

Finally, it has been found that in some cases, largely dependent upon the particular type of synthetic thermoplastic material being used to produce the articles, it can be advantageous if the blanks are first cooled down and subsequently are reheated, as has already been indicated earlier in the discussion of FIGS. 1A–1D as a possibility. The present invention makes this possible, and very readily so as is evident from FIGS. 1A–1D, and offers such a possibility without in any way reducing the production of final shaped articles per unit time.

It will be understood that each of the elements described above, or two or more together, may also find a useful application in other types of applications differing from the types described above.

While the invention has been illustrated and described as embodied in the blow-molding of hollow shaped articles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of converting plasticized synthetic plastic parisons into hollow shaped articles by blow-molding, comprising the sequential steps of forming a parison in an extrusion machine at a first station; pneumatically converting said parison at a second station into a hollow blank; transferring said hollow blank to an intermediate station; subjecting said hollow blank at said intermediate station to a first tempering operation by confining the blank within and in contact with a cooled open-and-shut tempering mold; thereupon subjecting said hollow blank at said intermediate station to at least one discrete second tempering operation by confining the blank in a tempering chamber, and blowing a stream of tempering air through said tempering chamber for contact with said blank, and only thereafter pneumatically further converting the tempered blank into a shaped article.

2. A method as defined in claim 1, wherein the step of pneumatically converting the tempered blank comprises subjecting the tempered blank to biaxial stretching.

3. A method as defined in claim 1, wherein the step of pneumatically converting the tempered blank comprises subjecting the tempered blank to biaxial stretching and the tempering steps comprise subjecting the hollow blank to such thermal conditioning as to impart to the hollow blank an optimum temperature for the subsequent biaxial stretching.

4. A method as defined in claim 1, wherein steps comprise said tempering and further comprising the step of subjecting said hollow blank to preliminary cooling at said second station prior to transfer of the hollow blank to said intermediate station.

5. A method as defined in claim 1, wherein the tempering comprises said reheating the hollow blank in at least said second tempering operation.

6. A method as defined in claim 1, wherein the tempering comprises said holding said hollow blank in at least said second tempering operation until the temperature of the hollow blank has become at least substantially equalized over the cross-sectional area of the wall thickness of the blank.

7. A method as defined in claim 1, said hollow blank having inner and outer surfaces; and wherein the tempering comprises subjecting said inner and simultaneously said outer surface to the thermal tempering.

8. A method as defined in claim 1, said hollow blank having inner and outer surfaces; and wherein the tempering comprises subjecting one of said surfaces to the thermal tempering before subjecting the other of said surfaces thereto.

9. A method as defined in claim 1, wherein the step of pneumatically converting said parison at said second station comprises subjecting the parison to rapid and shock-like cooling concomitantly with its conversion into said hollow blank.

10. A method as defined in claim 1; and further comprising the step of rotating said hollow blank in at least one of said tempering operations.

11. A method as defined in claim 1, said hollow blank having a longitudinal axis; and further comprising the step of rotating said hollow blank about said longitudinal axis thereof in at least one of said tempering operations.

12. A method as defined in claim 1, wherein the step of converting the tempered blank is carried out in a third station; and further comprising the step of transferring the tempered blank from said intermediate station to said third station.

13. A method as defined in claim 12; and further comprising transporting said hollow blank at said intermediate station between the respective tempering operations.

14. A method as defined in claim 1, wherein the step of subjecting the blank to a second tempering operation comprises effecting an at least substantial temperature equalization throughout the cross-section of the walls of the blank.

15. A method of converting plasticized synthetic plastic parisons into hollow shaped articles by blow-molding, comprising the sequential steps of forming a parison in an extrusion machine at a first station; pneumatically converting said parison at a second station into a hollow blank; transferring said hollow blank to an intermediate station; subjecting said hollow blank at said intermediate station to a first tempering operation by confining the blank within and in contact with a cooled open-and-shut tempering mold; thereupon subjecting said hollow blank at said intermediate station to at least one discrete second tempering operation by confining the blank in a tempering chamber, and blowing a stream of cooling air through said tempering chamber for contact with said blank; and only thereafter pneumatically further converting the tempered blank into a shaped article.

16. A method of converting plasticized synthetic plastic parisons into hollow shaped articles by blow-molding, comprising the sequential steps of forming a parison in an extrusion machine at a first station; pneumatically converting said parison at a second station into a hollow blank; transferring said hollow blank to an intermediate station; subjecting said hollow blank at said intermediate station to a first tempering operation by confining the blank within and in contact with a cooled open-and-shut tempering mold; thereupon subjecting said hollow blank at said intermediate station to at least one discrete second tempering operation by confining the blank in a tempering chamber, and blowing a stream of warm air through said tempering chamber for contact with said blank so as to raise the temperature thereof, and only thereafter pneumatically further converting the tempered blank into a shaped article.

* * * * *